United States Patent Office 3,327,532
Patented June 27, 1967

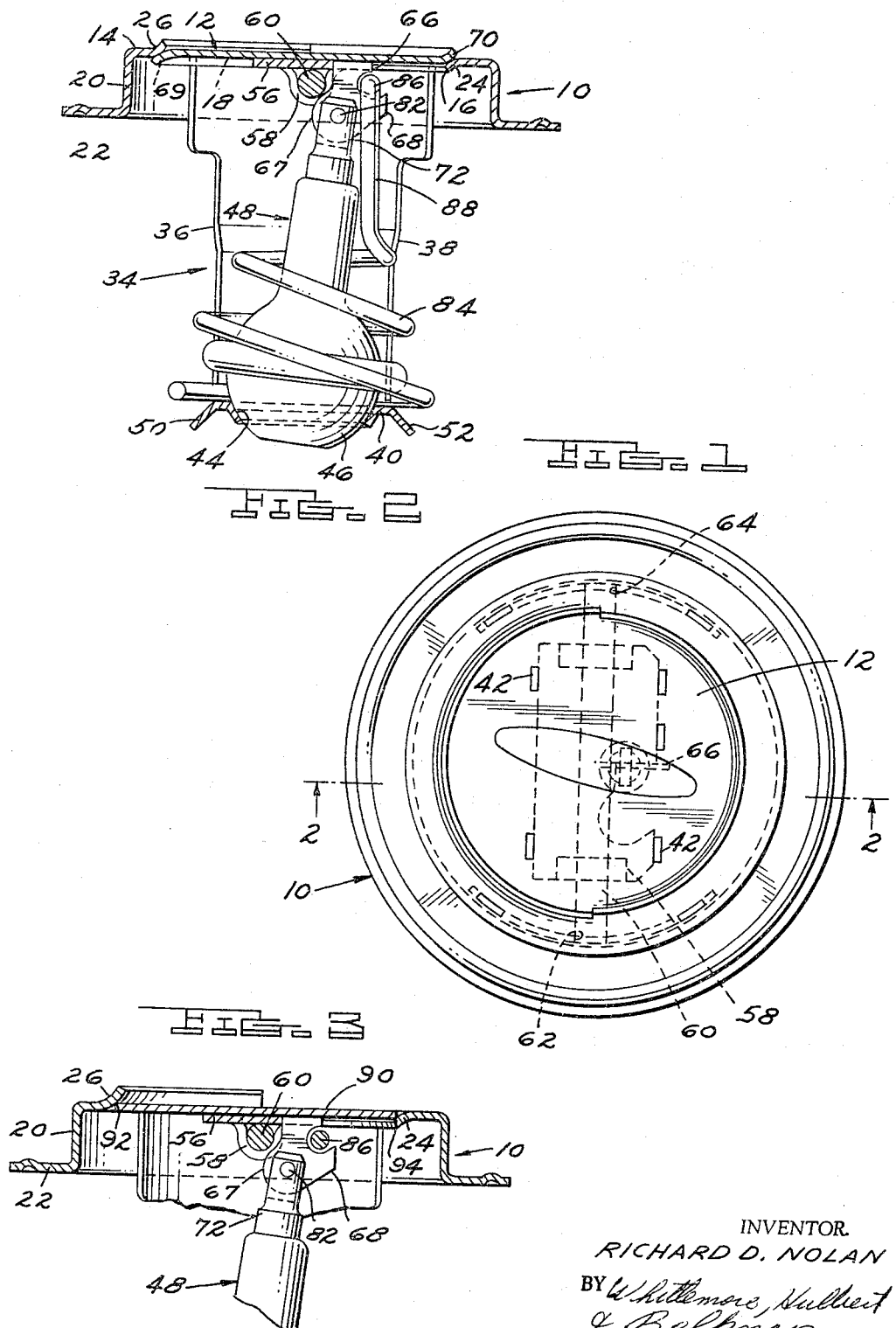

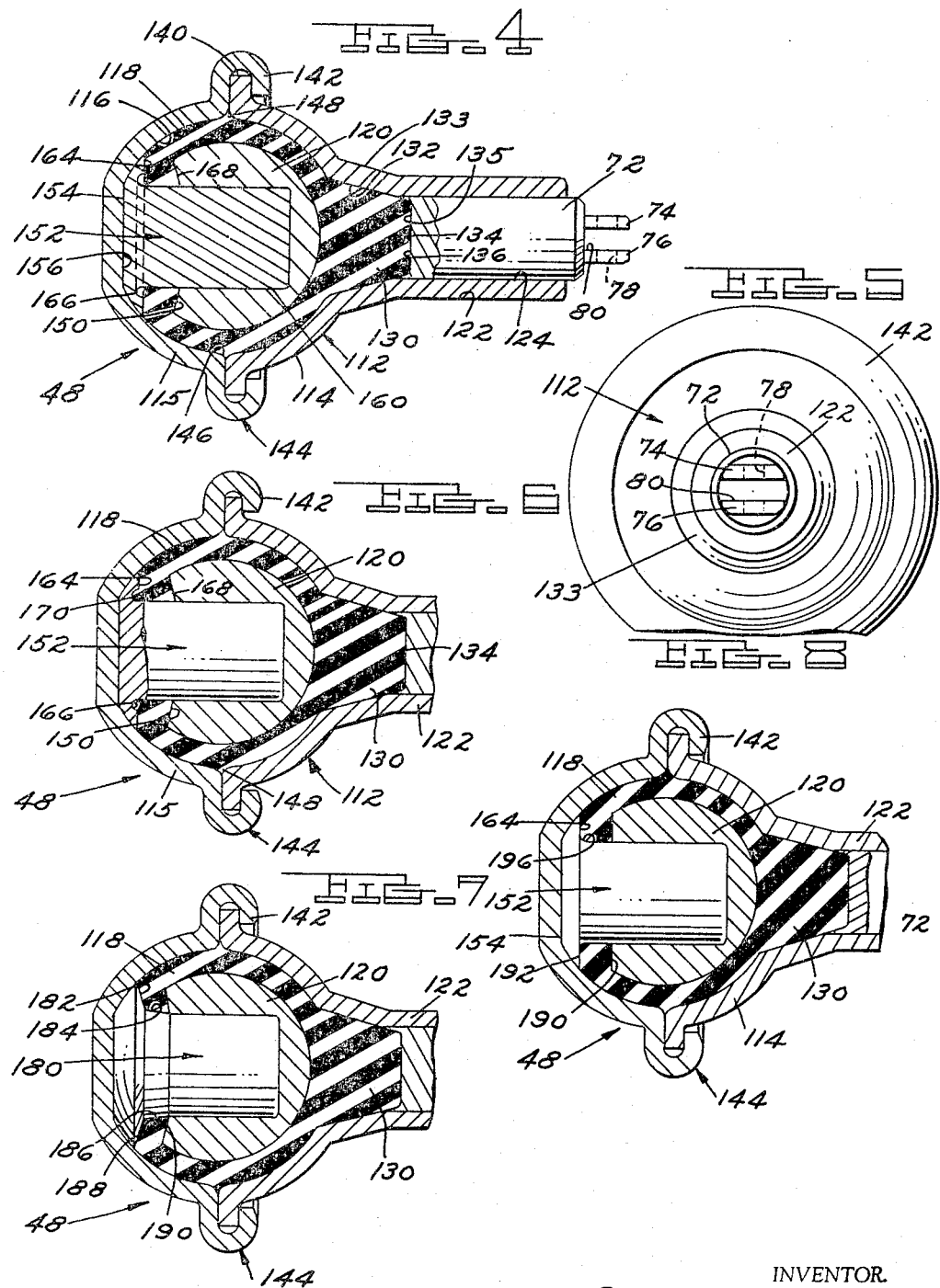

3,327,532
TEMPERATURE RESPONSIVE ACTUATOR
Richard D. Nolan, Birmingham, Mich., assignor to Advance Stamping Company, Detroit, Mich., a corporation of Michigan
Filed May 20, 1963, Ser. No. 281,671
2 Claims. (Cl. 73—368.3)

This invention relates to improvements in thermostatically operated valves which are particularly adapted for use in automobile cooling systems. More particularly, the present invention relates to a control device or actuator which is operative in response to a rise in temperature of a predetermined magnitude to produce a thrust of a considerable magnitude which is effective to actuate or otherwise communicate such condition to suitable control equipment connected thereto.

Temperature responsive actuators of the aforementioned type are in widespread use in industry for providing accurate and positive control of various processes and apparatuses in accordance with the surrounding thermal environment. Temperature responsive actuators of this general type conventionally employ suitable heat expansible materials which are designed to undergo a comparatively large controlled change in volume over a selected temperature range. The change in volume of the heat expansible material is transmitted through a suitable flexible diaphragm or through the peripheral wall of a sealed or closed capsule to a movable member which in turn transmits a high thrust to the equipment associated therewith.

Whether a diaphragm type actuator or a capsule type actuator is utilized, it is necessary to effectively seal the heat expansible material within the housing of the actuator in view of the extremely high pressures that are conventionally developed therein. Any seepage or leakage of the heat expansible material from such a temperature responsive actuator induces a lost motion operation therein which causes progressively greater deviations from its original calibrated actuating characteristics so as to render the actuator unsuitable or undesirable for continued use and operation.

Repeated flexing of the resilient diaphragm, as occasioned during the operating life of a temperature responsive actuator, has in many instances caused premature failure of the actuator by rupture or bursting of the diaphragm. Additional problems have also been encountered in connection with the manufacture and assembly of the temperature responsive actuators. The problems stated hereinbefore have been substantially eliminated by the present invention so as to assure an integrally sealed actuator that is substantially completely filled with the heat expansible material and which is appropriately calibrated for continued use over a long period of time.

It is an object of the present invention to provide an improved butterfly or flapper type of thermostatically operated valve of a simpler, more compact and economical and efficient construction than formerly.

Another object of the present invention is to provide a flapper type of thermo-statically operated valve having more effective sealing engagement with the edge of the valve opening when closed and having a simplified means of connecting the flapper valve to the piston of the temperature responsive actuator.

Still another object of the present invention is to provide an improved temperature responsive actuator which employs a self-contained resilient capsule in which a heat expansible material is disposed and to which heat is transferred through a metallic pin extending into the interior of the capsule and disposed with the head portion thereof in thermal conducting contact with the surrounding housing, said capsule being provided with means for sealing the heat transfer pin at the point where it enters the capsule.

A further object of the present invention is to provide an improved temperature responsive actuator of the aforementioned type wherein the head of the heat transfer pin directly opposite the resilient capsule is undercut to provide an annular relatively shallow recess or groove for the reception of the resilient capsule material surrounding the heat transfer pin during the expansion of the heat expansible material, the pressure of the expanded material being effective to urge the resilient material into the groove to prevent leakage.

A still further object of the present invention is to provide an improved temperature responsive actuator of the aforementioned type wherein the outside surface of the bottom wall of the capsule opposite the annular groove is provided with an annular rib which is received in the annular groove provided in the head of the heat transfer pin, said rib being adapted to seat tightly against the walls of the annular groove during the expansion of the heat expansible material.

Another object of the present invention is to provide an improved temperature responsive actuator having a self-contained resilient capsule provided with a heat transfer pin, the head of the heat transfer pin including a gradually inwardly sloping wall and a part of the stem of the heat transfer pin adjacent the head including a more abrupt inwardly sloping wall, the sloping walls of the pin being adapted to engage corresponding tapering or sloping surfaces provided in the bottom wall of the capsule.

Still another object of the present invention is to provide a thermal responsive actuator of the aforementioned type wherein the heat transfer pin is located on the same longitudinal axis as the piston of the actuator.

It is thus another object of the present invention to provide an improved low cost thermal responsive actuator having certain advantages contributing to design, durable operation, accurate control, efficiency, reliability and long life as well as ease of maintenance.

Other objects of the invention will become apparent as the following description proceeds especially when taken in conjunction with the accompanying drawings, illustrating a preferred embodiment of the invention, wherein:

FIGURE 1 is a top plan view of the thermostatic valve assembly of the present invention.

FIGURE 2 is a vertical sectional view taken substantially on line 2—2 of FIGURE 1.

FIGURE 3 is a fragmentary vertical sectional view of another embodiment of the present invention.

FIGURE 4 is a longitudinal sectional view of a temperature responsive actuator constructed in accordance with one embodiment thereof.

FIGURE 5 is an end elevational view of the temperature responsive actuator shown in FIGURE 4.

FIGURE 6 is a fragmentary longitudinal sectional view through a temperature responsive actuator constructed in accordance with another embodiment of the present invention.

FIGURE 7 is a fragmentary longitudinal sectional view through a temperature responsive actuator constructed in accordance with another embodiment of the present invention.

FIGURE 8 is a fragmentary longitudinal sectional view through a temperature responsive actuator constructed in accordance with still another embodiment of the present invention.

Referring now to FIGURES 1 and 2 of the drawings, an annular valve casing 10 is illustrated. The valve casing 10 may be attached in any suitable manner to a hose connection or water jacket structure of an internal combustion engine, through which cooling fluid is flowing, to control the temperature and flow of the cooling fluid by a flapper or butterfly valve indicated generally by the reference numeral 12.

The annular valve casing 10 and the flapper valve 12 may be made from metal stampings stamped from a sheet or plate of any suitable material, such as stainless steel, thus lending themselves to large scale economic production. The casing 10 is provided with a substantially flat upper annular portion 14. The inner marginal edge 16 of the annular portion 14 defines a valve opening 18 for the flapper valve 12 when the flapper 12 is in an opened position. The valve casing 10 includes an annular or circular upright wall portion 20 and a lower outwardly porjecting annular or circular flange portion 22 which may seat against an end of a conduit or wall structure of the cooling system of an internal combustion engine, not shown.

The valve opening 18 (when flapper 12 is opened) is of generally circular form. The wall or marginal edge 16 surrounding the opening 18 is provided with a pair of opositely turned seats 24 and 26, each having a transverse arcuate cross section. The seats 24 and 26 are diametrically opposite each other and each extends 180 degrees.

The housing 10 includes a cage 34 which is of generally U-shaped formation and is provided with parallel spaced side walls 36 and 38 extending upwardly from opposite sides of a connecting member or bridge 40. The upper edges of the side walls 36 and 38 are received within and appropriately secured to the flat upper annular portion 14 provided on the valve casing 10 such as by bent over tabs or by welding. The cage 34 may be made from suitable metals such as stainless steel and formed accordingly to well-known metal forming operations.

The bridge 40 has a central aperture which defines a downwardly extending spherical socket 44 for the lower spherical or ball-shaped portion 46 of the temperature responsive actuator 48. The outer edges of the bridge member 40 are provided with downwardly turned flanges 50 and 52.

The underside of the flapper valve 12 is provided with a shaft support 56 which is connected to the flapper 12 by a plurality of tabs 42 integrally carried by the shaft support 56 and which extend through corresponding openings in the flapper valve 12. The upper ends of the tabs 42 are staked or bent over to form a permanent connection between the support 56 and the flapper valve 12. The shaft support 56 includes a pair of axially spaced loops 58 through which the rotatable shaft 60 for the flapper valve 12 extends. The opposite ends of the shaft 60 are received in openings 62 and 64 provided in the walls 36 and 38 respectively. The openings 62 and 64 provide bearing surfaces for supporting the shaft 60 for rotation. The shaft support 56 includes an integral downwardly extending L-shaped spring support 66 as best illustrated in FIGURE 2. The spring support 66 is located in a vertical plane conatining the axis of the shaft 60. The spring support includes arms 67 and 68. The arm 68 defines an abutment for a spring to be subsequently described.

The outer periphery of the flapper valve 12 is provided with a pair of oppositely turned arcuate seating flanges 69 and 70 which are formed on the same radius. The seating flanges 69 and 70 are adapted to engage the seats 26 and 24 around the valve opening 18 when the flapper valve 12 is in the closed position illustrated in FIGURE 2. The flanges 69 and 70 have a transverse arcuate cross-section and are located diametrically opposite one another. The flanges 69 and 70 each extend 180 degrees.

The arcuate seats 24 and 26 are formed on the same radius as are the corresponding surfaces on the seating flanges 69 and 70. With such a construction, the seating flanges 69 and 70 contact the seats 24 and 26 in line contact at the points of tangency to thereby prevent dirt or small particles from lodging therebetween. In the past small particles between a substantially flat valve seat and flat flapper valve have prevented complete closing of the flapper valve.

The temperature responsive actuator 48 may take one of any number of forms such as illustrated in FIGURES 4–8. The spherically-shaped lower portion 46 is received in the spherical socket 44 to provide freedom of action for the thermo-actuator 48 to a maximum of 30 degrees with respect to the axis of the assembly. The temperature responsive actuator 48 includes a piston 72 which is adapted to move out of the housing of the thermo-actuator 48 upon expansion of the heat expansible material contained therein as will be subsequently described. The piston 72 is provided on the outer end thereof with a pair of outwardly extending lugs 74 and 76 which have axially aligned holes 78 therein as best illustrated in FIGURE 4. The arm 67 of the spring support 66 is received within the space 80 between the lugs 74 and 76 and is connected to the lugs by means of a pin 82. With such a construction, movement of the piston 72 is effective to open and close the flapper valve 12.

The bridge 40 also forms a seat for a coil spring 84. The coil spring 84 consists of a relatively few convolutions, converging in diameter from the lower end to the upper end thereof. The spring 84 has an integral upper hook portion 86 extending at substantially a right angle to the arm extension 88 of the spring 84. The hook portion 86 reacts against the spring support 66 and in particular against the arm 68 at a point offset laterally from the pivotal axis of the flapper valve 12. The spring 84 is effective to maintain the flapper valve 12 closed except when opened by the temperature responsive actuator 48.

The spring 84 is held in a predetermined position against the seat formed by the bridge 40 by means of a pair of inwardly turned tabs, not shown, which are struck out of the walls 36 and 38, respectively. The tabs are bent inwardly towards the axis of the assembly so as to hold the bottom convolution of the spring 84 firmly against the seat provided by the bridge 40.

FIGURE 3 illustrates another embodiment of the thermo-statically controlled valve. Where applicable, like numerical designations will be utilized for similar parts. The essential difference between FIGURE 1 and FIGURE 3 is in the construction of the flapper valve. Rather than utilizing a flapper valve having arcuately curved seating flanges 69 and 70, the flapper valve 90 illustrated in FIGURE 3 is flat and the peripheral edge portions thereof cooperate with the valve seats 24 and 26 for closing the flapper valve. With such a construction, one-half of the upper edge portion 92 of the flapper valve 90 seats against the seat 26 while the other one-half of the lower edge portion 94 seats against the seat 24. Such a construction provides line contact throughout 360 degrees and helps to minimize the possibility of foreign matter from becoming lodged in between the flapper valve 90 and the valve seats 24 and 26.

FIGURES 4 and 5 illustrate that the temperature responsive actuator 48 is provided with a two-piece housing or casing generally indicated at 112. The housing 112 includes a flanged cup-shaped body 114 and a flanged cup-shaped retainer or cap 115 of a configuration such that on assembly thereof into an integral unit, a cavity or chamber 106 is formed in which a resilient capsule 118 is located. The body 114 and the cap 115 are preferably constructed of a high strength metal having a relatively high coefficient of thermal conductivity such as, for example, copper, aluminum, and brass in order to facilitate transmission of heat from the medium surrounding the housing 112 through a heat transfer pin 152 to a heat expansible material 120 contained within the resilient capsule 118.

The heat expansible material 120 in the capsule 118 may comprise any suitable material which undergoes a relatively large change in volume over a selected temperature range and may include any material such as those disclosed in United States Patent No. 2,259,846, issued to Vernet et al. Heat expansible materials of this general type generally comprise waxes or blends of waxes which are formulated so as to achieve the desired volume change at any particular temperature level. The change in volume of such wax blends is primarily attributable to a change in volume on the transition of the material from a solid state to a liquid state and vice versa. The heat expansible materials may also incorporate heat conductive particles therein such as copper or other metallic fines, for example, which accelerate the transfer of heat through the material with a corresponding increase in the sensitivity of the actuator to changes in the thermal environment.

The resilient capsule 118 is made of any suitable, substantially incompressible material such as natural or synthetic rubber, or other suitable synthetic plastic materials which are able to withstand repeated expansion and contraction as occasioned by the expansion and contraction of the heat expansible material contained therein. The resilient materials are further selected so as to be resilient to degradation from the elevated temperatures to which they are exposed and to be chemically resistant to the heat expansible material contained therein and any suitable lubricants applied to the walls of the chamber 116 to minimize friction during relative movement therebetween. For this purpose, a variety of natural and synthetic rubbers have been found particularly suitable, providing excellent resilient characteristics and stability against degradation and chemical attack.

The body 114 of the two-piece housing 112 is formed with a tubular extension 122 which is integrally connected thereto and is formed with a circular bore 124 along the outer end portion thereof of a substantially uniform cross section in which the aforesaid piston 72 is slidably mounted. The outer end of the piston 72 is operatively connected to a controlled device, as an example the flapper valve 12, which is effective to initiate the appropriate action in response to actuation thereof by the outward inward reciprocatory movement of the piston 72 as previously described. The flapper valve 12 of the controlled device is conventionally spring loaded by the spring 84 so as to urge the piston 72 to the fully retracted position. This inward force is overcome by the pressure exerted by the heat expansible material 120 when it attains a preselected temperature forcing the piston 72 outwardly.

Reciprocation of the piston 72 to and from a retracted position to a projected position along the longitudinal axis of the housing 112, is achieved by the axial outward deflection of a cushion 130 integrally affixed to a substantially spherical wall of the resilient capsule 118 and disposed with its outer end portion 134 received in a recess 135 provided in the inner end of the piston 72. The cushion 130 is positioned in a throat section 132 of the tubular extension 122 and is disposed in communication with the circular bore 124 at one end and the chamber 116 at the other end. The throat section 132 is defined by wall portions 133 which are flat and tapered as shown in FIGURE 4. In the particular construction of the cushion 130 shown in FIGURE 4, the face of the end portion 134 positioned in contact with the inner face 136 of the piston 72 is flat.

The body 114, which constitutes the upper part of the housing 112, is provided with an outwardly extending flange 140. The cap 115, which is spherical and constitutes the lower part of the housing 112, is provided with an outwardly extending, inwardly turned U-shaped flange 142 which is adapted to receive the outwardly extending flange 140 provided on the body 114. The arms of the flange 142 are pressed together after the assembly of the housing parts to hold the parts together as illustrated. With such a construction, the flanges 140 and 142 form an annular rim 144. The spherically shaped cap 115 is adapted to be received in a spherical socket as described previously. The joinder of the mating faces of the flanges 140 and 142 form an annular V-shaped recess 146 extending around the interior of the chamber 116. The prevention of distortion and separation of this annular flange connection and improved seating characteristics of the the resilient capsule 118 is achieved by forming an annular integral V-shaped ridge 148 around the periphery of the resilient capsule 118 which is contoured to conform with the V-shaped recess 146 substantially completely filling the interior thereof. This feature is described in my copending application United States Ser. No. 243,344, entitled "Thermo-Actutaor," filed on Dec. 10, 1962. During the expansion of the cushion 130, as will be subsequently explained, the ridge 148 is free to move away from the recess 146 and returns to the position illustrated upon contraction of the cushion 130.

The resilient capsule 118 as shown in FIGURE 4 is provided with an inwardly and substantially radially extending sealing lip 150 which is integrally affixed to the wall portions thereof and in which a heat transfer pin 152 is sealingly disposed. The sealing lip 150 is positioned so that the longitudinal axis thereof is disposed in substantial alignment with the longitudinal axis of the tubular extension 122. The heat transfer pin 152 comprises an axially extending, cylindrical stem or shank 160 having an integral, radially outwardly extending head portion 154 which is adapted to be seated in firm heat conducting contact with an appropriately contoured wall portion 156 of the cap 115 and serves to maintain the resilient capsule 118 in appropriate alignment with the extension 122. The contact of the head portion 154 with the housing 12 provides a path for transmitting heat from the thermal environment surrounding the actuator 48 through the housing 112 and thence through the heat transfer pin 152 to the heat expansible material 120 contained within the resilient closed or sealed capsule 118.

The shank portion 160 of the heat transfer pin 152 projects inwardly beyond the end of the relatively short sealing lip 150, which presents a terminal inner radial edge in sealing engagement with the stem or shank 160, and pin 152 is disposed in thermal conducting contact with the heat expansible material 120 therein. In view of the relatively high pressures developed within the resilient capsule 118 during the expansion of the heat expansible material 120, good sealing characteristics must exist between the sealing lip 150 and the shank portion 160 of the heat transfer pin 152 to prevent any leakage of the heat expansible material 120 therefrom.

FIGURES 4-8 illustrate various ways of preventing elakage of the heat expansible material 120. In FIGURE 4, the inner surface 164 of the head 154 of the pin 152 is provided with a relatively shallow annular groove or recess 166 opposite the bottom wall of the resilient capsule 118. The annular groove 166 is adapted to receive resilient material displaced upon the expansion of the material 120. With such a construction the displaced resilient material from the bottom wall of the capsule completely fills the annular groove 166 and thereby helps to prevent leakage from the capsule 118, by reason of the effective axial seal in this zone against the inner surface of stem head 154. The inner portion of the lip 150 is provided with a single tapered surface 168 against which the pressure acts so as to urge a portion of the lip 150 into the annular groove 166. With such a construction the circumferentially directed pressure acting against the single tapered lip seal 150 is effective to tightly clamp over the periphery of the heat transfer pin 152 and to seal the groove 166 to prevent any channeling of the heat expansible liquid 120 therebetween.

FIGURES 6-8 relate to additional features of the present invention and where applicable, the same numerical designations as used for FIGURES 4 and 5 will be utilized to represent similar parts.

FIGURE 6 is similar to FIGURE 4 with the exception that an outwardly extending annular ridge 170 is provided on the outer surface of the bottom wall of the capsule 118. The annular ridge 170 is shaped to fit within the annular groove 166 and is so designed and arranged that upon expansion of the heat expansible material 120 the seal between the annular ridge 170 and the walls of the annular groove 166 is substantially increased so as to supplement the seal provided around the heat transfer pin by the lip seal. The expansion of the heat expansible material applies a force to the inwardly tapering surface 168 so as to tightly clamp over the periphery of the heat transfer pin 152 and to further urge the ridge 170 against the walls of the groove 166.

FIGURE 7 illustrates a heat transfer pin 180 wherein the inner surface of the head of the pin 180 is tapered inwardly toward the axis of the pin to provide an annular inwardly tapering surface 182. The shank or stem of the pin 180 is provided with a relatively short inwardly and axially tapering surface 184 which is adapted to engage a corresponding tapered surface 186 defining the opening in the bottom wall of the capsule 118 through which the pin 180 extends. The outer surface 188 and the inner surface 190 of the bottom of the capsule 118 are also inwardly tapered towards the axis of the heat transfer pin with the outer surface 188 engaging the sloping surface 182 provided on the head of the pin 180. With such a construction, it should be noted that the surfaces 182, 188, and 190 are substantially parallel to one another. With such a construction, the bottom wall of the capsule 118 is of substantially uniform thickness. When the heat expansible material 120 expands, the lip seal surrounding the pin 180 is urged outwardly so as to increase sealing engagement between the tapered surface 186 and the tapered surface 184.

FIGURE 8 illustrates still another embodiment wherein the capsule 118 is provided with a bottom wall wherein the inner and outer surfaces 190 and 192 are substantially perpendicular to the axis of the heat pin 152. With such a construction, the inner and outer surfaces 190 and 192 are arranged substantially parallel to the annular surface 164 provided on the head of the pin 152. A relatively small radius 196 is provided at the place where the stem of the pin 152 intersects the head 154. The bottom wall is provided with a corresponding radius. With such a construction, the surface of the bottom wall surrounding the opening sealingly engages the heat transfer pin. In addition, a seal is provided between the outer surface 192 of the bottom wall and the annular surface 164. Upon expansion of the heat expansible material 120, the seal between surfaces 192 and 164 is greatly increased due to the outward movement of the resilient material of the bottom wall of the capsule 118.

It has been found through actual tests that the various embodiments illustrated in FIGURES 4–8 effectively and positively seals the capsule 118 so as to prevent leakage of the material 120 acres the heat transfer pin.

The drawings and the foregoing specification constitute a description of the improved thermostatic valve in such full, clear, concise and exact terms as to enable any person skilled in the art to practice the invention, the scope of which is indicated by the appended claims.

What I claim as my invention is:

1. A temperature responsive actuator comprising a capsule having walls made of resilient material and containing a heat expansible material, the bottom wall of said capsule having an opening therein, an elongated heat transfer pin including a stem and a head on one end of the stem, said head having a portion extending radially outwardly of the stem, said stem extending through said opening into the interior of the capsule, a metal housing having a recess therein for receiving the capsule, said recess being shaped to conform to the configuration of said capsule, a piston abutting the top wall of said capsule and supported in said housing for reciprocatory movement in a direction substantially parallel to the axis of said heat transfer pin and adapted to be actuated by said top wall as it is expanded by the heat expansible material contained in said capsule, the portion of the bottom wall surrounding said opening forming a lip seal which sealingly engages the stem adjacent the head to prevent leakage from the interior of the capsule, said head having an inner surface in contact with the outer surface of said bottom wall and an outer surface in contact with the inner surface of said housing, said lip seal having axial sealing engagement against said radially outwardly extending portion of said head, the inner surface on said head and the inner and outer surfaces on said bottom wall being all tapered inwardly towards the axis of the heat transfer pin to cause movement of the lip seal in an outward direction along the heat transfer pin under the influence of the internal pressure developed within the interior of the capsule by the heat expansible material.

2. A temperature responsive actuator comprising a capsule having walls made of resilient material and containing a heat expansible material, the bottom wall of said capsule having an opening therein, an elongated heat transfer pin including a stem and a head on one end of the stem, said head having a portion extending radially outwardly of the stem, said stem extending through said opening into the interior of the capsule, a metal housing having a recess therein for receiving the capsule, said recess being shaped to conform to the configuration of said capsule, a piston abutting the top wall of said capsule and supported in said housing for reciprocatory movement in a direction substantially parallel to the axis of said heat transfer pin and adapted to be actuated by said top wall as it is expanded by the heat expansible material contained in said capsule, the portion of the bottom wall surrounding said opening forming a lip seal which sealingly engages the stem adjacent the head to prevent leakage from the interior of the capsule, said head having an inner surface in contact with the outer surface of said bottom wall and an outer surface in contact with the inner surface of said housing, said lip seal having axial sealing engagement against said radially outwardly extending portion of said head, said lip seal comprising a short and generally radially extending portion presenting an inner terminal edge in sealing engagement with the stem of said transfer pin, said stem having an axially and inwardly tapered surface adjacent said head, said terminal edge of said lip seal being axially and inwardly tapered to conform to said stem surface.

References Cited

UNITED STATES PATENTS

| | | | |
|---|---|---|---|
| 1,302,891 | 5/1919 | Balthasar | 251—305 |
| 1,302,938 | 5/1919 | Lippert | 236—66 |
| 2,323,533 | 7/1943 | Giesler | 236—34.5 |
| 2,656,113 | 10/1953 | Drapeau | 236—34 |
| 2,694,415 | 11/1954 | Dillon | 73—368.3 |
| 2,742,051 | 4/1956 | Chanda | 236—34 X |
| 2,786,633 | 3/1957 | Mayo | 236—34 |
| 2,803,494 | 8/1957 | Scherer | 73—368.3 |
| 3,186,230 | 6/1965 | Scherer | 73—368.3 |
| 3,187,577 | 6/1965 | Scherer | 73—368.3 |

LOUIS R. PRINCE, *Primary Examiner.*

LEONARD FORMAN, *Examiner.*

J. RENJILIAN, E. J. MICHAEL, S. C. SWISHER,
*Assistant Examiners.*